US005144298A

United States Patent [19]

[11] Patent Number: 5,144,298

[45] Date of Patent: Sep. 1, 1992

Henneuse

[54] DYNAMOMETRIC MEASURING ASSEMBLY FOR A DRILL PIPE EQUIPPED WITH MEANS OF RADIOTRANSMISSION

[75] Inventor: Henry Henneuse, Billere, France

[73] Assignee: Societe Nationale Elf Aquitaine (Production), France

[21] Appl. No.: 733,644

[22] Filed: Jul. 22, 1991

[30] Foreign Application Priority Data

Jul. 27, 1990 [FR] France ............................... 90 09638

[51] Int. Cl.[5] ............................................. G01V 1/00

[52] U.S. Cl. .................................. 340/854.6; 175/40

[58] Field of Search ............ 340/853, 854, 855, 854.6; 175/40; 166/250; 181/105, 108

[56] References Cited

U.S. PATENT DOCUMENTS

| | | | |
|---|---|---|---|
| 3,876,972 | 4/1975 | Garrett | 340/18 |
| 4,197,500 | 4/1980 | Klein et al. | 455/62 |
| 4,285,236 | 8/1981 | Chien | 73/151 |
| 4,715,451 | 12/1987 | Bseisu et al. | 175/40 |
| 4,881,083 | 11/1989 | Chau et al. | 340/855 |

*Primary Examiner*—J. Woodrow Eldred
*Attorney, Agent, or Firm*—Bacon & Thomas

[57] ABSTRACT

Dynamometric measuring assembly for a drill pipe, formed by a measuring device comprising, firmly attached to the rotating pipe, sensors and a first electronic circuit for conditioning the signals supplied by these sensors, a radiotransmitter mounted in a fixed manner on the rotating pipe and an acquisition unit. According to the invention, the measuring assembly furthermore comprises a radio receiver mounted on the rotating pipe and intended to allow the remote control of the measuring device.

6 Claims, 2 Drawing Sheets

DYNAMOMETRIC MEASURING ASSEMBLY FOR A DRILL PIPE EQUIPPED WITH MEANS OF RADIOTRANSMISSION

The present invention relates to a dynamometric measuring assembly for a drill pipe.

In order to produce a dynamometric device for measuring the accelerations and forces which are exerted on the drill pipe, the major problem is not to take the measurement but to transmit it under optimal conditions to the acquisition unit responsible for processing it. Thus, it is essential to prevent all causes of deterioration of the signals to be transmitted.

Furthermore, it is necessary to transmit the electrical signals from the rotating assembly constituted by the drill string towards a fixed reference point remote from the mast.

French patent application No. 89 08749 of Jun. 28th 1989 describes a dynamometric measuring device for a drill pipe, which device is connected to a data-acquisition unit by an electrical cable. The utilisation of such a cable requires that the device be equipped with a rotating commutator assembly disposed around the pipe. Furthermore, it is necessary to immobilise the external jacket of the device by an anti-rotating stop arm. In addition to the umbilical cables being difficult to install, and consequently to maintain, this type of device seriously compromises the adaptability of one drill mast to another.

The use of an umbilical cable, where each measurement is conveyed by a pair of electrical contacts, likewise raises difficulties in providing explosion-proof safety.

An object of the present invention is to alleviate these disadvantages.

In order to do this, the invention proposes a dynamometric measuring assembly for a drill pipe, which assembly is formed by a measuring device comprising, firmly attached to the rotating pipe, sensors and a first electronic circuit for conditioning the signals supplied by these sensors, the signals being transmitted to a remote acquisition unit by a radio transmitter mounted in a fixed manner on the rotating pipe, the device further comprising a radio receiver intended to receive signals transmitted by a remote unit, characterised in that it further comprises means allowing parameter assignment or the remote adjustment of the measuring device by the remote unit.

Other features and advantages of the present invention will appear more clearly on reading the description hereinbelow given with reference to the attached drawings in which.

Figure 1:
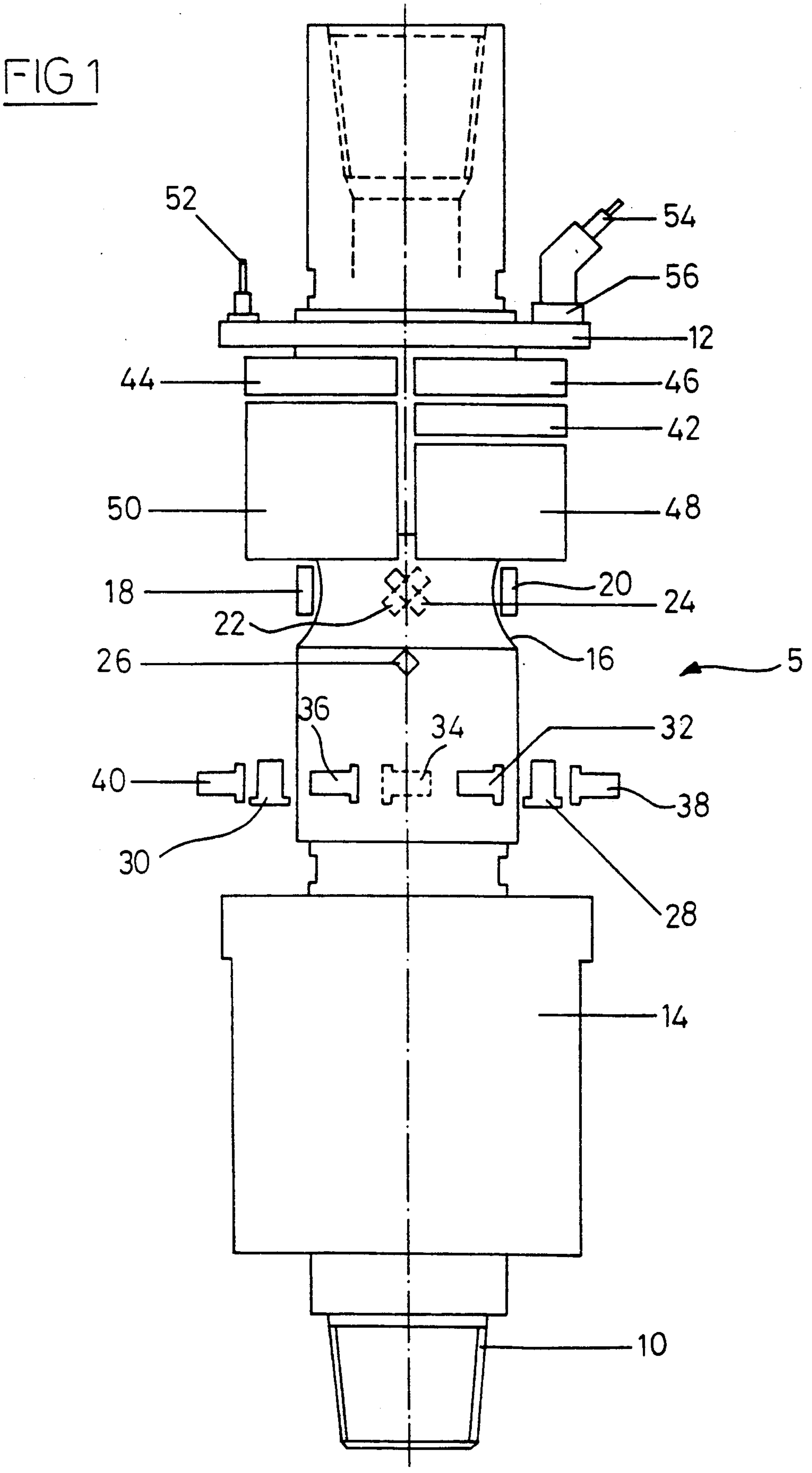
FIG. 1 represents a dynamometric measuring device.

As represented in FIG. 1, a dynamometric measuring device represented generally by 5 is placed on a drill pipe 10 in a space delimited by an upper collar 12 mounted in a fixed manner on the pipe 10.

A sheath 14 is put into place on the upper collar 12 so as to form a sealed volume around the pipe 10.

On the inside of the annular volume included between the sheath 14 and the pipe 10 are disposed, in a groove 16 of this pipe, strain gauges 18, 20, torsion gauges 22, 24, a temperature gauge 26, a pair of longitudinal accelerometers 28, 30, three transverse accelerometers 32, 34, 36 and two radial accelerometers 38–40. Each of these sensors constitutes a measurement channel. An electronic circuit 42 for processing the signals supplied by these various sensors is mounted firmly attached to the drill pipe 10, on the inside of the volume delimited by the sheath 14.

According to the invention, the dynamometric measuring assembly comprises a radio transmitter 44 and a radio receiver 46 which are mounted in a fixed manner on the pipe 10 and connected to the electronic circuit 42 for processing. Two assemblies of batteries 48 and 50 are mounted on the pipe 10 and provide an operating independence of 200 hours for the measuring device, a time which corresponds to the maximum duration separating two drill bit changes. The upper collar 12 is equipped with a radio antenna 52, as well as an emergency antenna 54, and a multiple electrical socket 56 intended to allow the charging of the batteries. The socket 56 likewise allows an operator to proceed to tests of the electronic circuits or a programming of the equipment if the two-way radio option is not retained.

Figure 2:
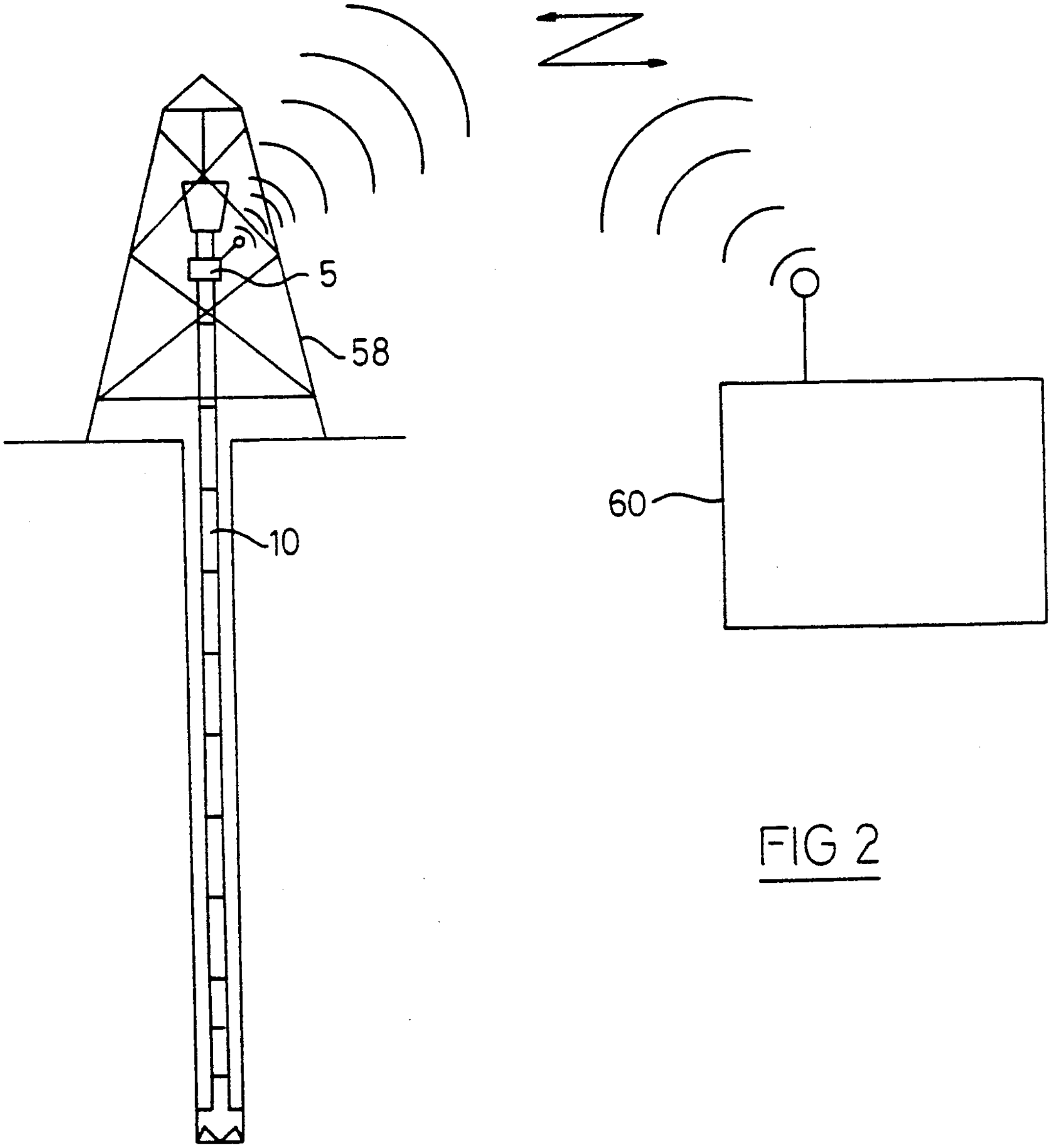
FIG. 2 represents the diagram of a dynamometric measuring assembly according to the present invention.

As is represented diagrammatically in FIG. 2, the dynamometric measuring device 5 is mounted on the upper end of a drill pipe hooked onto a mast 58. An acquisition unit 60, of the data transmitted by the transmitter 44, is disposed at a certain distance, for example 100 m, from the mast 58.

The dynamometric measuring assembly according to the invention allows a transmission between a remote unit and the radio receiver 46, which makes it possible to assign remotely the parameters of the measuring device without it being necessary to demount it. The assembly according to the invention further respects the standards on explosion-proofing which apply to drill sites.

As the assembly does not utilise electrical cables, its installation on a drill pipe is very simple, requiring only approximately 5 minutes for mounting the drill 10 between a conventional powered swivel and the drill string. For a mast equipped with a turntable, the time for mounting is of the order of 45 min.

As examples of signals which may be transmitted between the device 5 and the acquisition unit 60, there may be mentioned:

signals representative of measurements,
echoes, acknowledgements of receipt, user commands, returning of erroneous messages,
auto-diagnosis return (partial failure).

With regard to transmissions between the acquisition unit 60 and the device 5, it is possible to provide:

putting into operation or monitoring remotely,
parameter assignment or adjustment of the device or remote programming or remote maintenance of the device.

With regard to parameter assignment of the device, it is possible to mention as an example the selection of the measurement channels by multiplexing, which allows the provision of more sensors than transmittable measurements. It is likewise possible to provide adjustment of the conditioning stages, utilising programmable gain amplifiers, or to modify the characteristics of the band-pass or anti-aliasing filters. The value of this lies in artificially increasing the quality of analog/digital conversion allowing, for example, a gain of 1000+12 bits equivalent to 22 resolution bits, the dynamic remaining naturally at 12 bits. Furthermore, it is possible to provide adjustment of the device in accordance with the capacity of the transmission channels, either of the pass band (sampling rate) of each channel, or of the resolution of digital/analog conversion.

According to another aspect of the invention, the dynamometric measuring device may comprise means allowing it to transmit on a plurality of radio frequencies in order to become free of a very congested radio environment. To this end, the device comprises means allowing it to search, by scanning, for the frequencies which, at a given moment, best meet the requirement for transmission quality as much from the point of view of the level of the radio fields, for example, as from the environment of the operations or from the instantaneous or continuous electromagnetic disturbance.

I claim:

1. Dynamometric measuring device for a drill pipe comprising:

a) sensors attached to the drill pipe;

b) a first electronic circuit attached to the drill pipe for conditioning the signals supplied by the sensors;

c) a radio transmitter mounted in a fixed manner on the drill pipe for transmitting the signals supplied by the sensors;

d) a remote acquisition unit for receiving said signals; and e) a radio receiver for receiving signals transmitted by the remote acquisition unit, said radio receiver comprising adjustment means for adjusting the measuring device in response to signals transmitted by the remote acquisition unit.

2. Device according to claim 1, further comprising means allowing said radio receiver to search, by scanning, optimum transmission frequencies transmitted by the acquisition unit.

3. Device according to claim 1, wherein said adjustment means permits parameters of the measuring device to be adjusted by the remote acquisition unit.

4. Device according to claim 3, wherein said parameters include measurement channel selection.

5. Device according to claim 3, wherein said parameters include band pass or anti-aliasing filter modification parameters.

6. Device according to claim 3, wherein said parameters include gain amplifier settings.

* * * * *